United States Patent [19]

Morikawa et al.

[11] Patent Number: 4,520,235
[45] Date of Patent: May 28, 1985

[54] ELECTRONIC KEY TELEPHONE SYSTEM

[75] Inventors: Kenichi Morikawa; Kazuyuki Nagatomi; Mitsuo Katanuma, all of Tokyo, Japan

[73] Assignee: NEC Corporation, Tokyo, Japan

[21] Appl. No.: 493,199

[22] Filed: May 10, 1983

[30] Foreign Application Priority Data

May 10, 1982 [JP] Japan .................................. 57-77902

[51] Int. Cl.$^3$ ........................ H04M 1/00; H04M 1/72
[52] U.S. Cl. .............................. 179/99 LS; 179/99 M
[58] Field of Search .............. 179/99 LS, 99 M, 99 R, 179/99 LC, 18 ES, 18 AD

[56] References Cited

U.S. PATENT DOCUMENTS 4,125,749 11/1978 Kinoshita et al. ............... 179/99 M Primary Examiner—Stafford D. Schreyer
Attorney, Agent, or Firm—Sughrue, Mion, Zinn, Macpeak & Seas

[57] ABSTRACT

An electronic key telephone system comprising multiple key telephone stations 8-1 each connected to a central switch 2 by a single communication line 10-1 and to a central control unit 3, 4, 5 by a single data line 9-1. Each station has a plurality of buttons 150 for specifying a service request and a display 120 of current service status and means for periodically transmitting service requests over the data path. The central control unit periodically receives on the data line service requests from each of the buttons and transmits service status information to the station.

7 Claims, 11 Drawing Figures

ELECTRONIC KEY TELEPHONE SYSTEM

BACKGROUND OF THE INVENTION

The present invention relates to an electronic key telephone (EKT) system and, more particularly, to a control between a key service unit and key telephone or station sets included in an EKT system.

An EKT system allows a plurality of central office (CO) lines to be connected to a plurality of key station sets which belong to one subscriber. Each station set is capable of selecting any one of the CO lines or intercommunicating with another station set in the system. Such a system comprises, in addition to the station sets, a key service unit adapted to switch the lines, control the station sets, supply power and perform other various operations.

A station set offers various advanced services employing depression of buttons, flashing of lights and generation of an intermittent tone. For this purpose, the key service unit and each station set exchange with each other various data such as button data and lamp data in addition to speech communications. The key service unit and station set are, therefore, usually interconnected by two wires for communication exchange and two wires for data exchange, i.e. four wires in total. Power is supplied employing either one of the two sets of wires.

In the prior art EKT system, the key service unit scans a plurality of its associated station sets periodically at predetermined intervals so as to exchange data therewith. Each of the button on/off data and lamp on/off data has a string of bits which are allocated in a one-to-one relation to the buttons or the lamps, so that a bit position in the data designates a specific button or a specific lamp. Therefore, when the number of the buttons and/or that of the lamps is increased for more service features, the length of data exchanged between the key service unit and the key station sets will become longer and thereby susceptible to distortions due, for example, to the impedance in data paths. Moreover, an additional circuit will be required for compensating the data waveforms.

Meanwhile, the lamps at each station set is turned on and off directly controlled by the key service unit. Hence, they cannot flash at a frequency higher than the scanning frequency of the key service unit, that is, the scanning frequency cannot be determined regardless of the flashing frequency of the lamps.

A current trend in this art is, for advanced services, for the use of relatively simple character displays or the like in addition to the traditional lamps, loudspeakers and others available for display purpose on stations sets. The result would be a variety of modes of audible and visible display including different modes of lamp flashing, different frequencies and intervals of a tone and different characters indicated by the character display. Again, the prior art system which allocates display status data one bit to each display element is unsuitable for accommodating such various manners of display for the reason previously described.

In the prior art system, sources for generating a dial tone, a busy tone and the like are installed in the key service unit only, that is, the delivery of such tones to a station set is effected over a communication line. Therefore, when a call for a specific station set is received at one CO line while the specific set is communicating with another CO line, a dial tone representative of the receipt of the call cannot be sent to the specific station set.

SUMMARY OF THE INVENTION

It is therefore an object of the present invention to eliminate the drawbacks inherent in the prior art electronic key telephone system and provide an improved electronic key telephone system which is capable of delivering button data and service status data for lamps and other display elements and controlling key station sets with this data, the system accommodating an ever increasing demand for more service features.

The invention is a key telephone system for selectively connecting a plurality of telephone stations to a plurality of telephone lines which includes a central switching means and a central control means. A plurality of key telephone stations are connected to the central switching means each by a single communication path and are each also connected to the central control means by a single data path. Each of the telephone stations includes a plurality of means for displaying service status, sources for operating the display means, a plurality of buttons for specifying service request, and means for periodically transmitting over the data path service request information to the central control means in response to the service request. The central control means includes means for periodically transmitting over each of the signal data paths service status information to a selected one of the telephone stations, means for receiving the service request information, means for comparing the service request information with immediately preceding service request information to produce a noncoincidence signal. The service status information is changed in response to the noncoincidence signal to present service status information. Each of the key telephone station includes means for connecting a selected one of the display means to a selected one of the sources in response to the service status information.

In accordance with a specific feature of the present invention, an electronic key telephone system comprises n (integer not smaller than 2) key telephone sets and a key service unit which has a central processing unit thereinside, controlling the key telephone sets and key service unit based on a stored program. Each of the key station sets comprises l (integer) display means for displaying a service, first converter/checker means for converting serial service status information supplied to the key station set from the key service unit into parallel service status information and checking for an error in the service status information by an error check code to supply only error-free information, decoder/display control means for decoding the service status data supplied from the first converter/checker means and operating a selected one of the l display means designated by the data in a mode also designated by the data, button data generator means for generating button data indicative of depressed one of the buttons repeatedly at a predetermined period, and first error check code adding and converting means for adding an error check code to parallel button data supplied from the button data generator means to convert the button data into serial button data and transmitting the serial button data to the key service unit in response to the receipt of the service status data. The key service unit, on the other hand, comprises storage means for storing service status data which specifies one of the display means at each of the telephone sets and an operation mode of that set and button data associated with the respective telephone sets, second error check code adding and converting means for adding an error check code to parallel service status data read out of the storage means by the central processing unit to convert the parallel data into serial service status data, second converter/checker means for converting serial button data supplied from the telephone sets into parallel button data and checking an error in the parallel button data by an error check code to supply error-free button data to the central processing unit, start scan signal generator means for generating at a predetermined period a start scan signal for causing a sequential scan to be started from the first telephone set up to the "nth" telephone set, data switch means for switchingly connecting in response to the start scan signal the key service unit to the first telephone set from the instant of the start of transmission of the service status data from the key service unit to the first telephone set up to the instant of completion of the receipt of button data from the first telephone set and, thereafter, sequentially connecting the key service unit to the second to "nth" telephone sets, each timed to a switching signal from the central processing unit.

In accordance with the present invention, data specifying a display element and a mode of display thereby is encoded and fed to a key telephone set and this telephone set decodes the data to select a drive source installed therein and control the display element in the specified mode. When a lamp X is to be repeatedly turned on for one second at an interval of one second, the key service unit of the prior art system, which may scan a key telephone set at a period of 50 milliseconds, has to repeatedly deliver twenty off-commands and then twenty on-commands successively to the specific telephone set for a desired period of time. In accordance with the present invention, once the key service unit supplies a telephone set with service status information "turn on lamp X for one second at 1-second interval", a circuit installed in the telephone set for controlling display elements repeatedly turns on the lamp X for one second at 1-second intervals from that instant. Such operation may be interpreted as a conversion of a microcommand into a macrocommand, which reduces the overhead time of the key service unit. For this purpose, each telephone set in accordance with the present invention, different from the prior art key telephone set, is furnished with display drive sources and a display control circuit.

BRIEF DESCRIPTION OF THE DRAWINGS

An embodiment of the present invention will be described with reference to the accompanying drawings in which:

FIGS. 2(a) through 2(e) are a timing chart representing various data formats and their relationship;

DESCRIPTION OF THE PREFERRED EMBODIMENT

Figure 1:
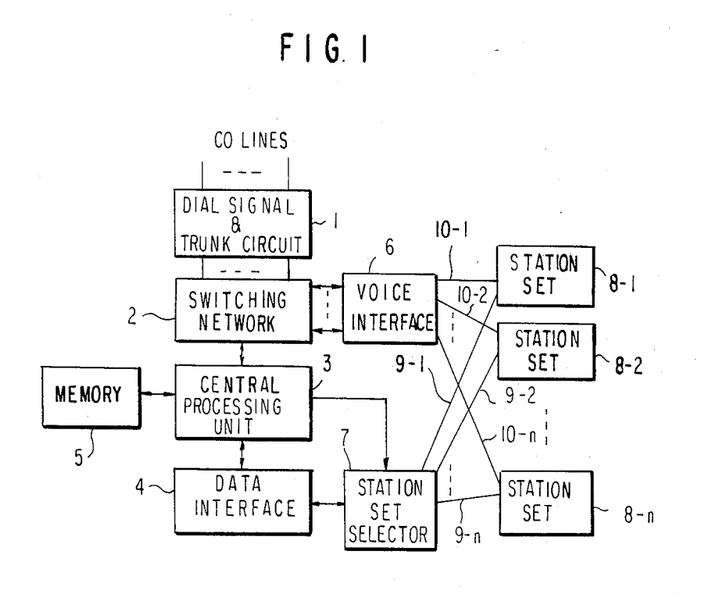
FIG. 1 is a block diagram of essential components of an electronic key telephone system in accordance with the present invention.

Referring to FIG. 1 of the drawings, a plurality of CO lines are connected to a dial signal transmit and trunk circuit 1 which in turn is connected to columns of a matrix arranged in a switching network 2. The rows of the switching network 2 are individually connected to voice circuits of a plurality of key telephone or station sets 8-1 to 8-n (n being an integer not smaller than 2) via a voice interface circuit 6 and communication paths or lines 10-1 to 10-n. The switching network 2 is controlled by a central processing unit (CPU) 3. Connected with the CPU 3 are a memory 5 made up of a ROM and a RAM, a data interface circuit 4, and a station set selector circuit 7 which is controlled by switching signals supplied from the CPU 3. The data interface 4 is connected to data circuits of the station sets 8-1 to 8-n via the station set selector 7 and data paths or lines 9-1 to 9-n. The data interface 4 includes various circuits such as for generating timing pulses to be fed to the CPU 3, converting serial data into parallel data or vice versa, modulating and demodulating data, checking data errors and detecting data variation. The structural elements mentioned so far, except for the station sets 8-1 to 8-n, constitute the key service unit of the electronic key telephone system.

The system in accordance with the illustrated embodiment has various service features including originating or answering calls over the CO lines at any of the station sets 8-1 to 8-n, and intercommunication between the station sets. All these operations are caused by manipulation of buttons at each station set 8 and are notified to the CPU 3 via the data paths, station set selector 7 and data interface 4, thereby being controlled according to a program stored in the ROM of the memory 5. The RAM of the memory 5 serves as a temporary storage associated with the CPU 3 which may store display status data inclusive of lamp data to be delivered to the station sets 8-1 to 8-n and, also, button data delivered from the station sets, while being operable as a timer for counting time or the like.

Referring to FIGS. 2(a)-2(e), there is shown a timing chart representing display status data or button data which may be exchanged over the data paths. The data format shown in FIG. 2(a) has a sync signal and, following it, eight data bits and, following it, a parity bit. Data "0" uses a clock pulse and data "1" is a pulse prepared by enlarging the width of the clock pulse. Such a data format will promote easy detection of data because clock pulses can always be received with ease. The overall data shown in FIG. 2(a) has a length $T_1$. The key service unit and each station set will intercommunicate using display status data and button data in the illustrated format.

Figure 2A:
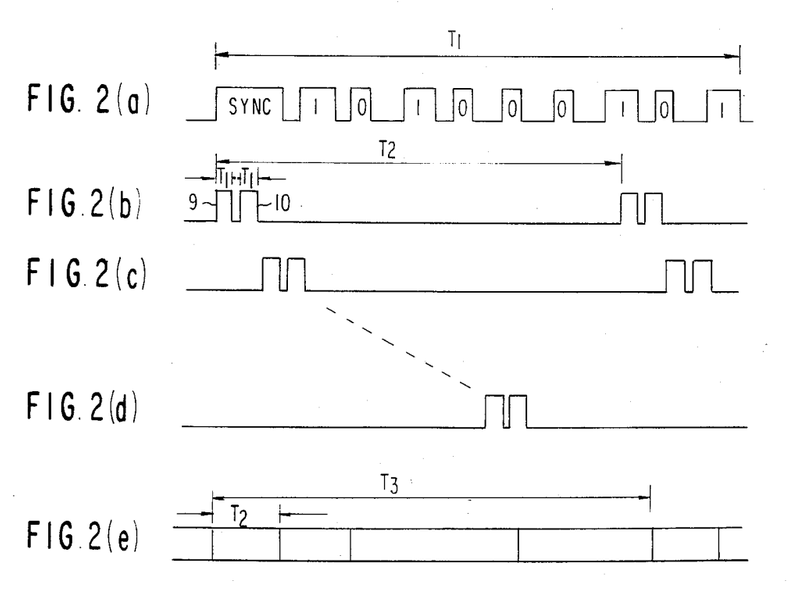

FIG. 2(b) is a timing chart showing a manner of data exchange between the key service unit and the station set 8-1. The key service unit connects itself to the station set 8-1 by a scan and then supplies it with display status data 9 in the format shown in FIG. 2(a). Note the differing time scales on FIGS. 2(a) and 2(b). The station set 8-1 responds to the input data 9 by returning button data 10 to the service unit also in the format as shown in FIG. 2(a). After the communication with the station set 8-1, the key service unit scans the station set 8-2 to exchange data therewith in the same manner but according to the timing shown in FIG. 2(c). This procedure is repeated until the key service unit scans the station set 8-n as represented by the timing chart of FIG. 2(d). As soon as the scanning cycle is completed, the CPU 3 processes the results of the data exchange between the key service unit and the individual station sets. This is the end of a procedure associated with one display element of all the station sets. The time period for the key service unit to access or scan all the station sets is $T_2$.

Where the number of display elements to be controlled at each station set is 1, the scanning cycle described above will be repeated 1 times to complete the access to all the display elements of all the station sets and such is illustrated in FIG. 2(e), once again on a differing time scale from FIGS. 2(b) and 2(c). As shown, the access period is $T_3$ which is $1 \times T_2$. Paying attention to a specific station set, therefore, control data for a specific display element will be supplied at every interval of $T_3$ or $1 \times T_2$.

How the data exchange and display control described above is performed will be discussed with reference to FIGS. 3 and 4.

Figure 3:
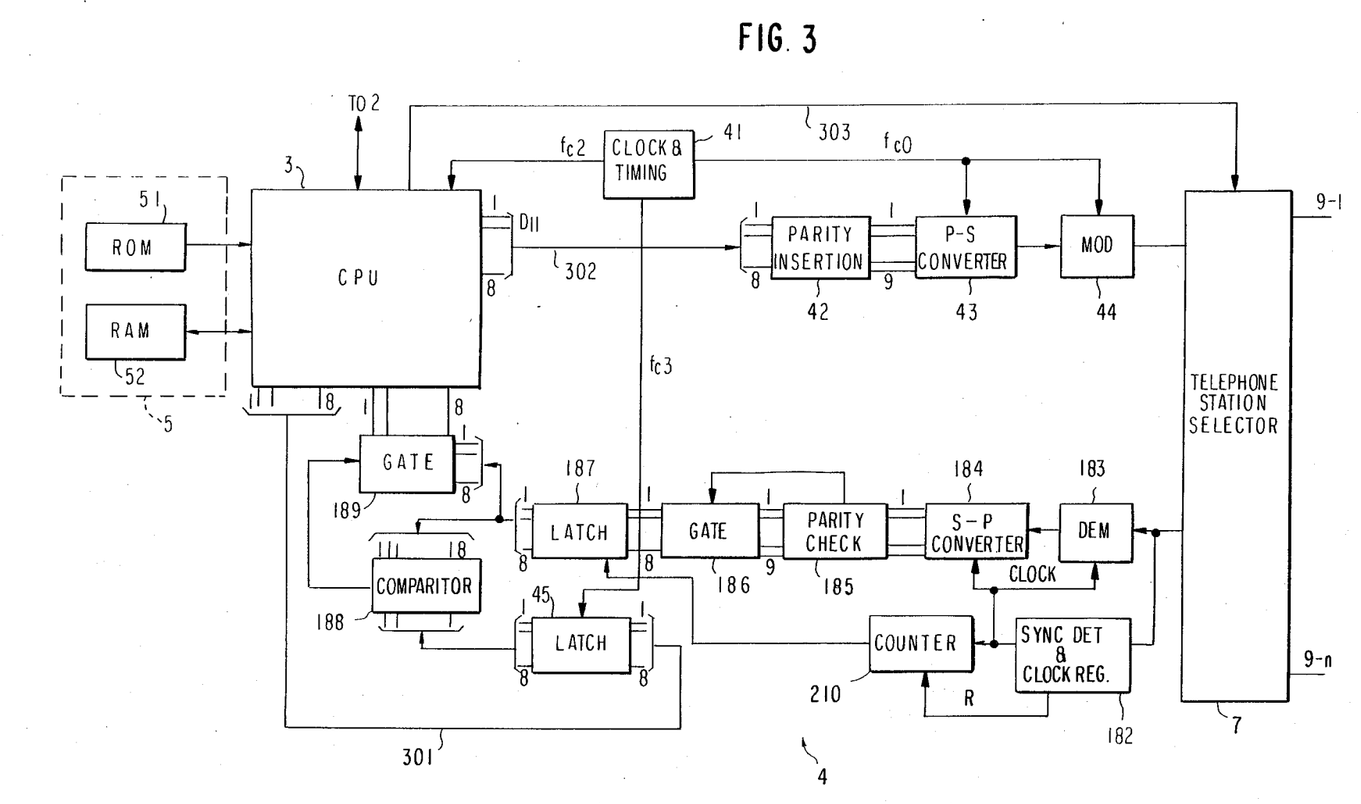
FIG. 3 is a block diagram of a data interface of a key service unit included in the system of FIG. 1.

FIG. 3 is a block diagram of the data interface 4 shown in FIG. 1 and apparatus adjacent thereto. FIG. 4 is a block diagram of a display status and button data transceiver circuit installed in each station set of FIG. 1.

Figure 6:
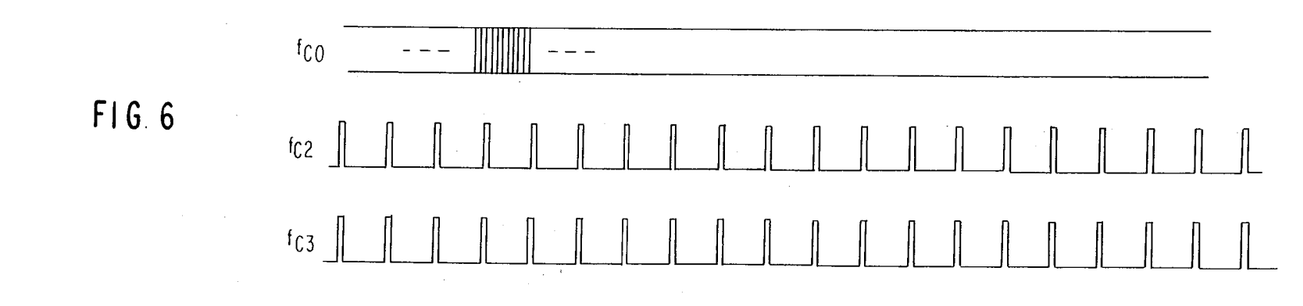
FIG. 6 is a timing chart demonstrating the operation of a clock and timing control circuit included in the arrangement shown in FIG. 3.

Referring to FIG. 3, a clock and timing generator circuit 41 is adapted to generate timing pulses which will be used by the CPU 3 as well as other circuits. The output waveforms of the clock and timing generator circuit 41 are shown in FIG. 6. As every interval of $T_2$, the clock and timing generator 41 supplies the CPU 3 with a start scan pulse $f_{c2}$ for causing the key service unit to periodically start scanning the station sets. In response to the pulse $f_{c2}$, the CPU 3 begins a scanning cycle based on a program stored in a ROM 51 of the memory 5, thereby exchanging information with the individual station sets. In detail, the CPU 3 first reads 8-bit button data for the station set 8-1 out of a RAM 52 of the memory 5. As soon as the CPU 3 delivers the button data via lines 301 to a latch 45 in response to a latch pulse $f_{c3}$, it reads 8-bit display status data associated with the button data out of another location of the RAM 52 and supplies it via lines 302 to a parity bit insertion circuit 42. The display status data $D_{11}$ (parallel eight bits) is in the form of a code which designates one of the numerous lamps at the station set to be turned on and a mode of its operation. The CPU 3 also supplies the key telephone station selector 7 with a switching signal. The selector 7 comprises a gate circuit which, in response to the switching signal on a line 303, first connects the station set 8-1 to data interface 4 via the data path 9-1.

The parity bit insertion circuit 42 inserts a parity bit into the display status data $D_{11}$ so that 9-bit parallel data will come out therefrom. The parity bit will be a "1" when the number of "1"s in the 8-bit display status data is odd and a "0" when it is even. A parallel-to-serial converter 43 transforms parallel data into serial data. Clock pulses $f_{c0}$ delivered by the clock and timing generator 41 are modulated to prepare a sync signal which is added to the serial output of the converter 43, the resulting signal being fed to the station set 8-1 in the FIG. 2(a) format via the selector 7 and data path 9-1.

Figure 4:
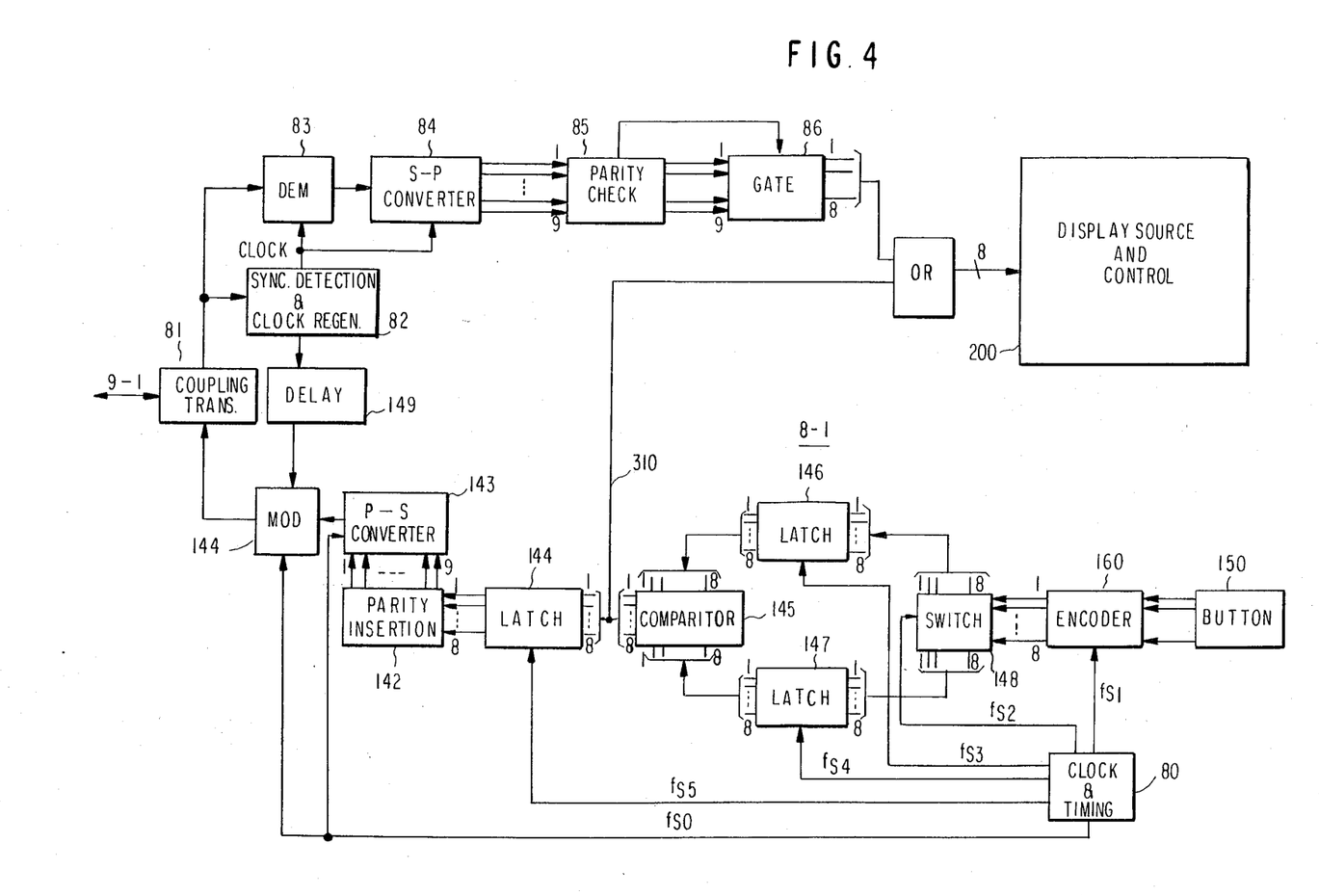
FIG. 4 is a block diagram of essential components of a data interface of a telephone station for use in the system of FIG. 1.

Referring to FIG. 4, the display status information entering the station set 8-1 is passed through a coupling transformer 81 to a sync detector and clock regenerator circuit 82 and a demodulator circuit 83. The sync detector and clock regenerator 82 functions to detect the sync signal and recover the clock pulses. The demodulator 83 removes the sync signal from the data format shown in FIG. 2(a) and delivers the serial data to the serial-to-parallel converter 84, which processes the input serial data into 9-bit parallel data. A parity checker circuit 85 determines whether or not the input data is erroneous through the parity bit and, then, removes the parity bit to deliver only the error-free or correct display status data to a display, source and control circuit 200 via a gate circuit 86.

Figure 5:
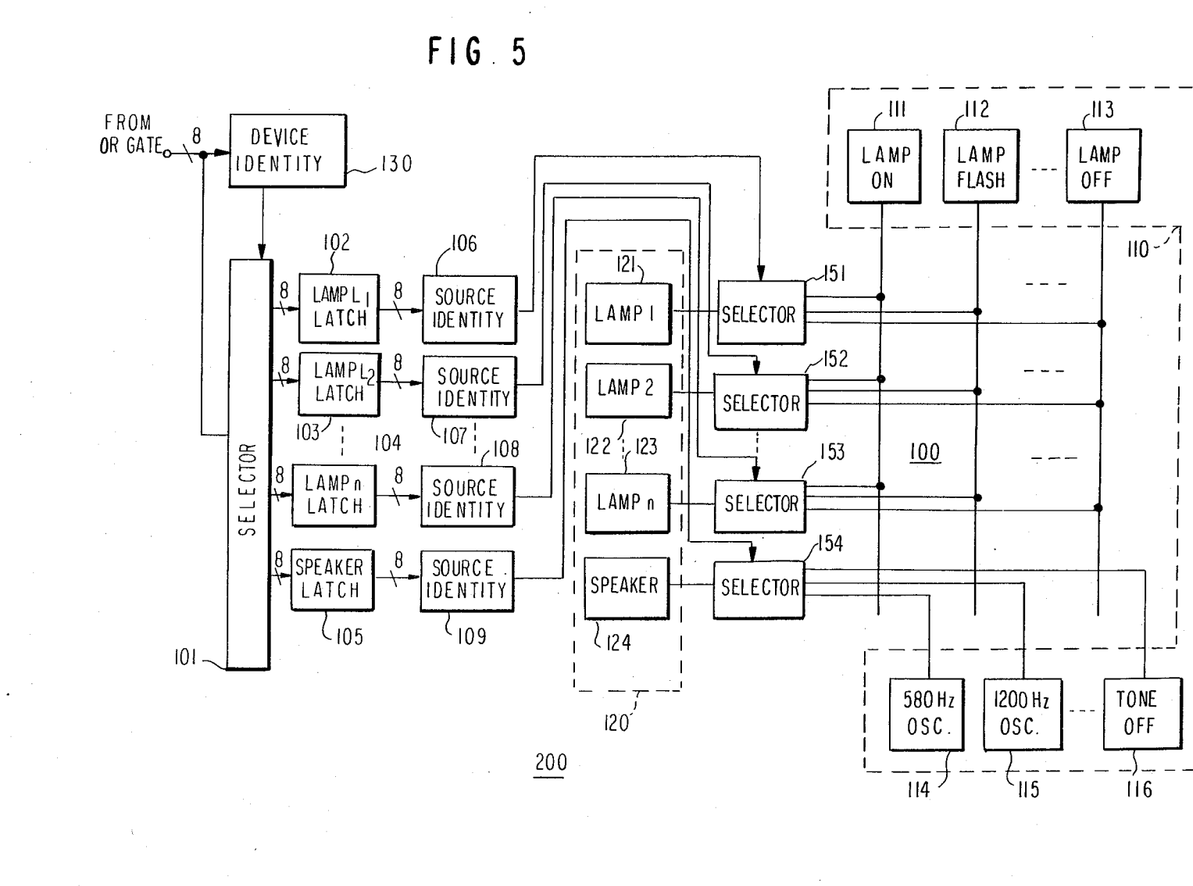
FIG. 5 is a block diagram of essential components of means for identifying a device and a source, and devices and sources/associated therewith.

As shown in FIG. 5, the display, source and control circuit 200 of the station set 8-1 includes a display unit 120, a source unit 110 and a display status data decoding and control circuit. The display unit 120 may include lamps 121–123 individually associated with CO lines or intercom lines in the system, and a loudspeaker 124. The source unit 110 includes a source 110 for turning on the lamps, a source 112 for flashing the lamps, a source 113 for turning off the lamps, an oscillator 114 for supplying the loudspeaker 124 with a 580 Hz frequency, an oscillator 115 for supplying it with a 1,200 Hz frequency, and a source 116 for turning off a tone. The lamps 121–123 are individually connected to the lamp sources 111–113 by source selectors 151–153, while the loudspeaker 124 is connected by a source selector 154 to the tone sources 114–116. Thus, each of the selectors 151–153 selects a lamp source to which its associated lamp is to be connected, and the selector 154 selects a tone source to which the loudspeaker 124 is to be connected. The 8-bit data appearing at the output 8 of an OR gate shown in FIG. 4 has upper four bits and lower four bits which indicate a specific hexadecimal number. This OR gate output is applied to a device identity circuit 130 of FIG. 5 which identifies one of predetermined device codes with which the hexadecimal number coincides and, thereby, one of the devices specified by the display status data. Latches 102–105 associated with the respective display devices are connected to a device selector 101. The outputs of the latches 102–105 are connected to source identity circuits 106–109 respectively. Controlled by the device identity circuit 130, the selector 101 supplies the input 8-bit data to one of the latches which is associated with the specified device, i.e. latch 102. Then, the source identity circuit 106 identifies one of the sources designated by the data and controls the selector 151 to connect the lamp 121 to the designated lamp source, e.g. source 111, thereby turning on the lamp 121. The source identification is made based on the data in each of the eight bits. Although not shown for simplicity, the clock and timing circuit 80 supplies a latch with a latch pulse when the selector 101 has selected the specific latch.

The display status data for a given display element is delivered periodically from the key service unit at intervals of $T_3$, thereby updating the display mode. Hence, malfunctions of the display elements is eliminated which might otherwise result from data errors due to noise in the transmission paths or the like.

Button status data will be sent out in the following manner.

Figure 7:
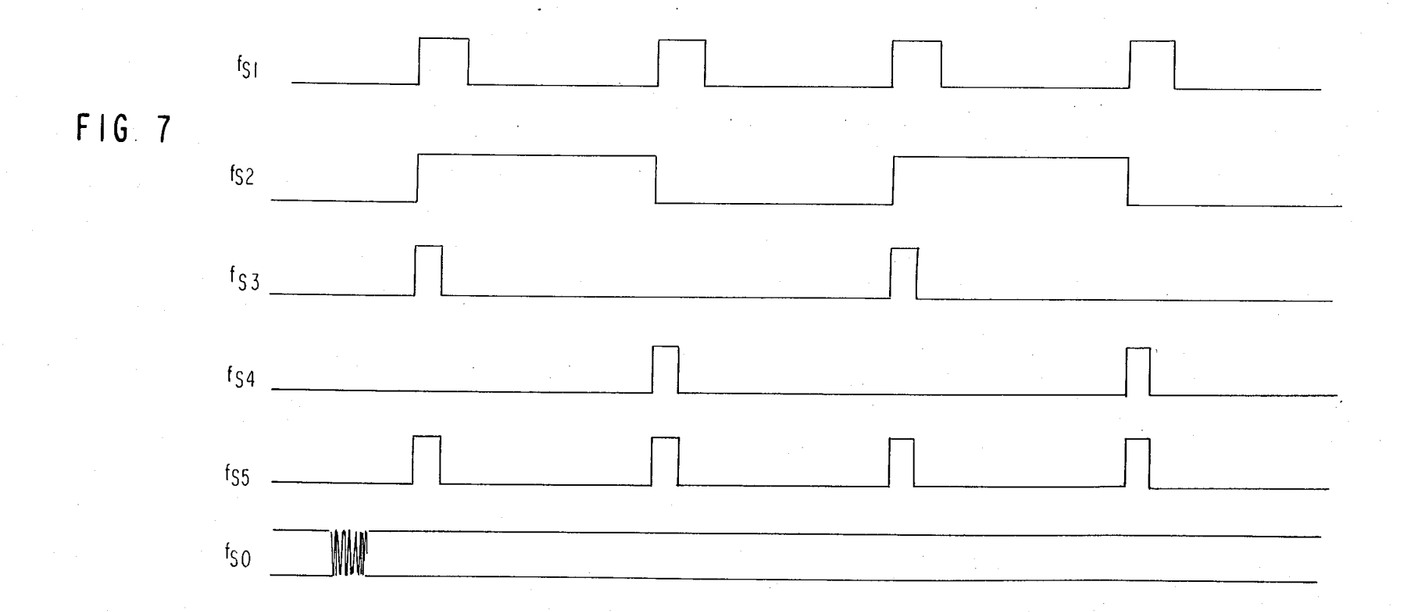
FIG. 7 is a timing chart showing the operation of a clock and timing control circuit of FIG. 4.

Turning back to FIG. 4, a button circuit 150 in the station set 8-1 includes various buttons (nonlocking buttons). As any one of the buttons is turned on or off, the button circuit 150 makes a request for a service particular to the operated button. An encoder 160 converts the request into an 8-bit code assigned to the specific button. When the button is turned off, the encoder 160 will produce an 8-bit code whose bits are all "0"s. The coded data is sampled and produced at each pulse of a timing signal $f_{s1}$ which is output from the clock and timing circuit 80. The output waveforms of the clock and timing circuit 80 are shown in FIG. 7. It will be noted that the period of the timing pulses $f_{s1}$ is of a value which sufficiently detects even the shortest time of manual button depression and overcomes chattering of the buttons which would entail incorrect button data.

The 8-bit button data is fed to a switching circuit 148. Supplied with a timing signal $f_{s2}$ from the clock and timing circuit 80, the switching circuit 148 alternately routes the button data from the encoder 160 to latch circuits 146 and 147. The button data stored in the latch circuits 146 and 147 are compared with each other by a comparator circuit 145 and, if coincident, the coincident button data will be gated into a latch circuit 144. These latch circuits 146, 147 and 144 are also supplied with latch pulses from the clock and timing circuit 80. The 8-bit output data of the latch 144 is fed to a parity insertion circuit 142 which adds a parity bit to the 8-bit input data. The resulting 9-bit parallel data is fed to a parallel-to-serial converter 143 which, in response to a timing pulse signal $f_{s0}$ from the clock and timing circuit 80, processes the parallel data into serial data. A modulator 144, controlled by a timing signal from a delay circuit 149, modulates the clock $f_{s0}$ with the serial data which will be fed thereto from the parallel-to-serial converter 143. The modulator 144 adds a sync signal to the modulated clock and supplies the composite signal to the coupling transformer 81, again in the data format shown in FIG. 2(a). The delay provided by the delay circuit 149 is such that a timing pulse appears upon the lapse of the time $T_1$ shown in FIG. 2(a) after the sync, detection and clock regeneration circuit 82 has detected a sync pulse fed from the key service unit. Here, a certain period of time, i.e., $T_3$ at the maximum under the error-free condition, is necessary for the key service unit to supply display status data in response to the button data. To cause a lamp to be actuated immediately after the depression of a button, the output of the comparator 145 is fed to the display, source and control circuit 200. After the actuation, the lamp will be actuated again by display status data which will be delivered via lines 310 from the key service unit to the station set.

The data signal fed from the station set 8-1 to the key service unit via the data path 9-1 is gated via the selector 7, as shown in FIG. 3, into a demodulator 183 and a sync, detection and clock regeneration circuit 182. The demodulator 183 demodulates the input data into serial data with the sync signal removed. A serial-to-parallel converter 184 converts the serial output of the demodulator 183 into parallel data which is then delivered to a parity check circuit 185. The parity check circuit 185 checks data errors based on the parity bit, removes the parity bit and then supplies only the correct button data to a latch circuit 187 via a gate circuit 186. Latch pulses for the latch 187 are prepared by a counter 210.

Meanwhile, the latch 45 has already stored the button data which the CPU 3 read out of the RAM 52 of the memory 5 from the previous scan for the station set 8-1. A comparator 188 compares the latest button data stored in the latch 187 with the button data stored last time in the latch 45 and, if noncoincident, delivers an inconsistency signal to a gate circuit 189. This enables the gate 189 so that the latest button data from the latch 187 is gated into the CPU 189 via the gate 189. That is, if no error exists in the data and if the button data arrived this time is different from that arrived last time, the latest button data is supplied to the CPU 3. Such delivery of data to the CPU 3 after detection of data variation will be successful to prevent introduction of incorrect data due to a long button depression.

The CPU 3 performs various processings in response to the latest button data such as substituting it for the last button data of the station set 8-1 stored in the RAM 52, and rewriting the display status data also stored in the RAM 52 and associated with the station set 8-1. This is the end of the data exchange between the key service unit and the station set 8-1 with respect to one display element.

Next, the CPU 3 supplies the selector 7 with a switching signal so that the station set 8-2 is brought into connection with the data interface 4 via the data path 9-2. Thereafter, as has been the case with the first station set 8-1, display status data and button data will be exchanged between the key service unit and the station set 8-2 with respect to a lamp 1. The same procedure will be repeated down to the station set 8-n, completing the control over the lamps 1 of all the station sets.

The clock and timing generator 41 supplies the CPU 3 with another start scan pulse $f_{c2}$ whereby the CPU 3 starts and completes a control over the lamps 2 at all the stations sets. The other lamps 3 and the like are controlled by the procedure described above. The control over the n×l display elements at all the station sets and the processings of n×l button data are completed within the time $T_3$. In response to an interrupt request, the system will control the specified display element prior to the others while shifting the previously mentioned scanning sequence. The operation described will repeated periodically at the intervals of $T_3$ to attain the function of a key telephone system.

As described above, the illustrated embodiment of the present invention does not allow a key service unit to directly effect control over display elements of its associated station sets and, instead, furnishes each station set with a circuit for controlling display object drive sources and the display elements. With this construction, the key service unit is capable of controlling the display elements in various modes by a plurality of bits of display status data, thereby realizing advanced services and more display elements without any increase in the data length. Another advantage is the reduction of distortion in the data paths.

Because the direct control over the display elements by the key service unit is avoided, any scanning period can be selected as desired regardless of the flashing period of the lamps.

Tone sources, which are one of the display drive sources, are installed in each key telephone set. These tone sources, therefore, can be controlled by display status data through the data path even while the station set is communicating with one CO line. It follows that when a call meant for the specific station set is received at another CO line, a dial tone will be generated through its loudspeaker without the intermediary of any communication line.

Furthermore, the embodiment shown and described features safeguards against erroneous data due to erroneous button depression, collection of erroneous data due to depression of a button over a substantial period of time, and delayed operation of a lamp in response to depression of a button, each being concerned with the collection of button data. Additionally, concerning delivery of data, the embodiment is capable of detecting errors by adding a parity bit to the data, and of correcting erroneous indication by display elements by periodically supplying status data.

The data interface circuit 4 is only illustrative and may be replaced by a microprocessor in which case the function will occur on a program control basis. Also, a microprocessor may be built in each key telephone set in order to process display status data and button data and control the display elements by a program control.

Any number of bits other than the shown and described eight bits may be employed for each of the display status data and button data.

In summary, it will be seen that the present invention provides an electronic key telephone system in which a key service unit supplies a key telephone set with a plurality of bits of display status data which designates a specific display element and a mode of display thereby, while the key telephone set decodes the display status data and, in response to the decoded information, a display control circuit actuates each display element in the specified mode. This makes the data length shorter than control data employed in a prior art system, permits a scanning period to be designed regardless of the display modes of display elements, and informs a telephone set of the receipt of a call at one CO line by a tone even when the telephone set is in communication with another CO line, thereby meeting an ever increasing demand for more service features.

What is claimed is:

1. A key telephone system for selectively connecting a plurality of telephone stations to a plurality of telephone lines, said key telephone system comprising:
   central switching means;
   central control means; and
   a plurality of key telephone stations each being connected to the central switching means by a single communication path and also being connected to the central control means by a single data path, each of the key telephone stations including first to lth means for displaying service status, source means for generating various signals indicative of modes of service, a plurality of buttons for specifying service request, and means responsive to receipt of service status information sent from the central control means for transmitting over the data path to the central control means service request information of the buttons corresponding to the display means identified by the service status information; wherein
   said central control means including means for scanning the key telephone stations in the first to lth display means, in such a manner that the telephone stations are successively accessed in each ith ($1 \leq i(\text{integer}) \leq 1-1$) display means of the key telephone stations, and then in each (i+1)th display means, to transmit over each of the data paths each service status information and to receive each service request information, each service status information being generated in response to receipt of each service request information sent from the key telephone stations;
   each service status information is made up of data identifying one of the first to lth display means and specifying the modes of service; and
   each of the telephone stations includes means responsive to the service status information for selecting any of the various signals to be supplied to identified display means.

2. A key telephone system, as recited in claim 1, wherein said central control means further comprises means for comparing the service request information with immediately preceding service request information to produce a noncoincidence signal, said service status information being changed in response to said noncoincidence signal to present service status information.

3. A key telephone system, as recited in claim 1, wherein the service status information includes lamp data, the service request information includes button data for selecting telephone lines and the display means include a lamp.

4. A key telephone system, as recited in claim 3, further including means responsive to a control signal of the central control means for successively selecting one of the key telephone stations to be supplied with the lamp data, the control signal being generated responsive to receipt of button data sent from a selected one of the key telephone stations.

5. A key telephone system, as recited in claim 4, wherein the scanning means periodically repeats a scanning action.

6. A key telephone system, as recited in claim 5, wherein each data of the service request information and the service status information is made of bits.

7. A key telephone system for selectively connecting a plurality of telephone stations to a plurality of telephone lines, the key station system comprising:
   central switching means;
   central control means; and
   a plurality of key telephone stations each being connected to the central switching means by a single communication path and also being connected to the central control means by a single data path, each of the key telephone stations including first to lth lamps for displaying service status, source means for generating various signals indicative of modes of service, a plurality of buttons for selecting telephone lines, and means responsive to receipt of lamp data sent from the central control means for transmitting over the data path to the central control means button data of the buttons corresponding to the lamps identified by the lamp data; wherein
   the central control means includes means responsive to receipt of each button data sent from the key telephone stations for successively generating and transmitting each lamp data for the first to lth lamps of the key telephone stations in such an order that each lamp data for ith ($1 \leq i(\text{integer}) \leq 1-1$) lamps of the key telephone stations is successively generated then each lamp data for (i+1)th lamps is successively generated and so on, and means responsive to a control signal of the central control means for successively selecting one of the key telephone stations to be supplied with the lamp data, the control signal being generated responsive to receipt of button data sent from a selected one of the key telephone stations;
   wherein each of the lamp data and the button data comprises a plurality of bits, the lamp data including information identifying one of the first to lth lamps and specifying the modes of service; and
   each of the telephone stations includes means responsive to the lamp data for selecting any of the various signals to be supplied to identified lamps.

* * * * *

UNITED STATES PATENT AND TRADEMARK OFFICE
CERTIFICATE OF CORRECTION

PATENT NO. : 4,520,235
DATED : May 28, 1985
INVENTOR(S) : Kenichi Morikawa, et al.

It is certified that error appears in the above-identified patent and that said Letters Patent is hereby corrected as shown below:

Column 2, line 46, delete "1" insert --$\ell$--;
         line 55, delete "1" insert --$\ell$--.
Column 3, line 23, before "nth", insert --the--;
         line 68, delete "sources/associated" insert --sources associated--.
Column 5, line 15, delete "1" insert --$\ell$--;
         line 16, delete "1" insert --$\ell$--;
         line 20, delete "1" insert --$\ell$--;
         line 23, delete "1" insert --$\ell$--.
Column 8, line 32, delete "1" insert --$\ell$--;
         line 33, delete "1" insert --$\ell$--;

Column 9, line 43, delete "1th" insert --$\ell$th--;
         line 53, delete "1th" insert --$\ell$th--;
         line 56, delete "1-1" insert --$\ell$-1--;
         line 65, delete "1th" insert --$\ell$th--.

UNITED STATES PATENT AND TRADEMARK OFFICE
CERTIFICATE OF CORRECTION

PATENT NO. : 4,520,235

DATED : May 28, 1985

INVENTOR(S) : Kenichi Morikawa, et al

It is certified that error appears in the above-identified patent and that said Letters Patent is hereby corrected as shown below:

Column 10, line 37, delete "1th" insert -- $\ell$th--;
line 49, delete "1th" insert -- $\ell$th--;
line 51, delete "1-1" insert -- $\ell$-1--;
line 63, delete "1th" insert -- $\ell$th--.

Signed and Sealed this

Eleventh Day of February 1986

[SEAL]

Attest:

DONALD J. QUIGG

Attesting Officer

Commissioner of Patents and Trademarks